O. B. ELDER.
BORING TOOL.
APPLICATION FILED MAR. 25, 1909.
963,022.
Patented June 28, 1910.
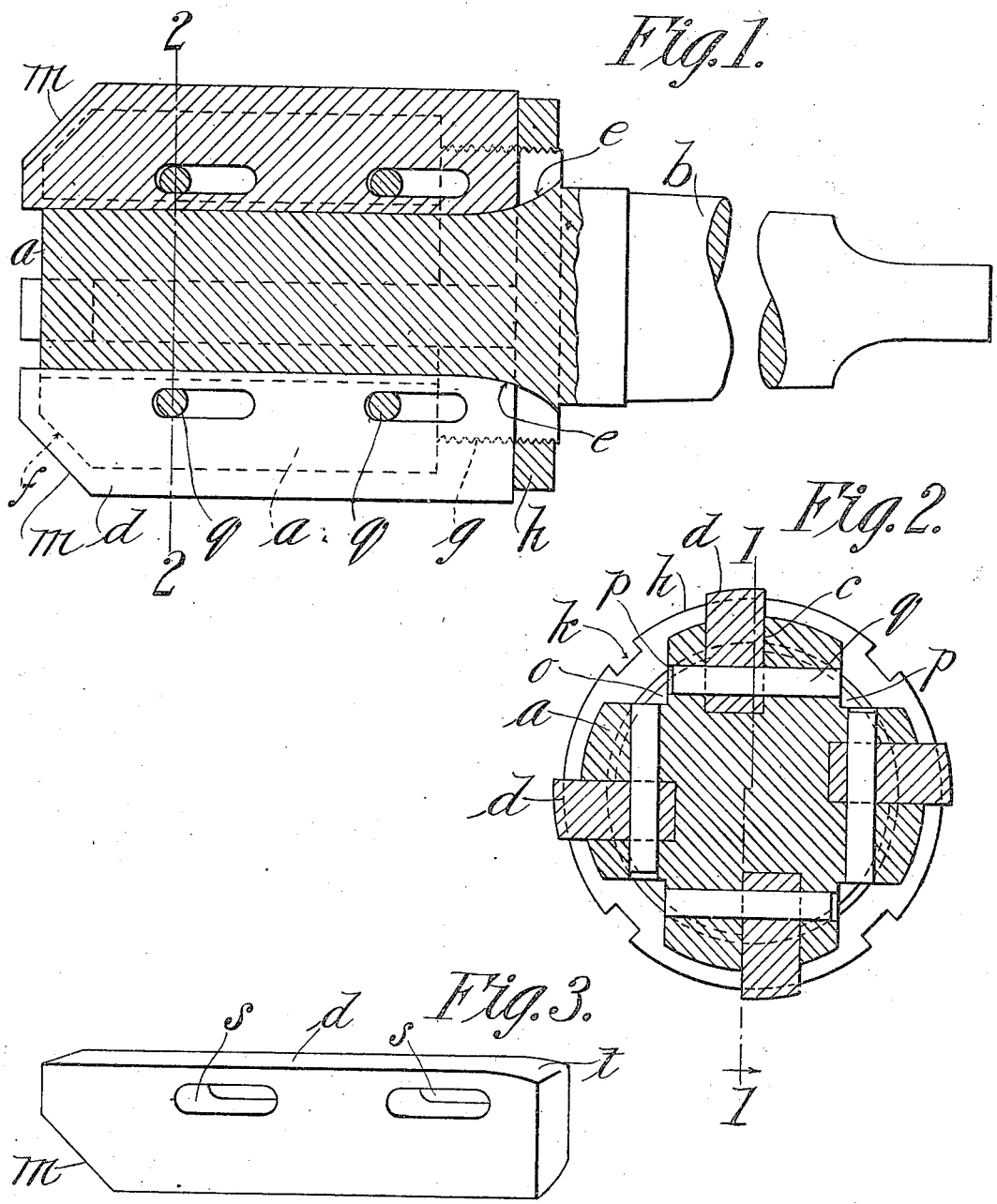
INVENTOR.
Oscar B. Elder
BY
Chapin Rees.
ATTORNEY.
WITNESSES:

UNITED STATES PATENT OFFICE.

OSCAR B. ELDER, OF CHICOPEE FALLS, MASSACHUSETTS, ASSIGNOR OF ONE-HALF TO GEORGE BRAITHWAITE, OF CHICOPEE FALLS, MASSACHUSETTS.

BORING-TOOL.

963,022.

Specification of Letters Patent. Patented June 28, 1910.

Application filed March 25, 1909. Serial No. 485,786.

*To all whom it may concern:*

Be it known that I, OSCAR B. ELDER, a citizen of the United States of America, residing at Chicopee Falls, in the county of Hampden and State of Massachusetts, have invented new and useful Improvements in Boring-Tools, of which the following is a specification.

This invention relates to boring tools and has for its object an improvement in tools of this character which will drill or bore a hole to exact size, the construction embodying removable and adjustable center drilling or boring members supported in a solid head.

In the drawings forming part of this application,—Figure 1 is a vertical, longitudinal section of the boring tool embodying the invention, the plane of the section being on the line 1—1, Fig. 2. Fig. 2 is a cross sectional view taken on the line 2—2, Fig. 1. Fig. 3 is a perspective view of one of the removable boring and reaming members, and Fig. 4 is a perspective view of one of the pins used to lock the member in proper position in the head.

Referring now to these drawings, $a$ indicates the solid head of the boring tool, and $b$ the tapered integral shank thereon whereby it is supported in operation in the usual way. This solid head has grooves $c$ milled therein for the reception of the boring members $d$. The grooves in which the members $d$ are seated extend from the forward end of the head $a$ back toward the shank $b$, their rear ends being outwardly curved, as at $e$,—these curved ends running out practically at or near the surface of the shank next to the head. This curve results merely from the milling operation and is, therefore, but an incidental feature. The head proper, as indicated by $a$, has the forward edge thereof beveled off at an angle of about 45° as at $f$, and the rear end thereof has a portion turned down to a diameter somewhat less than the diameter of the head, but greater than the diameter of the shank, this turned down portion being screw-threaded as at $g$,—the groove $c$ being milled through this threaded portion, as shown in Fig. 1. On this screw-threaded portion $g$ of the head $a$ is fitted a nut $h$, preferably provided with notches $k$, in its periphery, to the end that a spanner may be used for screwing it up. The grooves $c$ (in this case four in number) are milled in the head $a$ at equal distances apart, and are so disposed that when the boring and reaming members $d$ are seated therein, the plane of their cutting edges $m$ will lie a little beyond two rectangularly disposed lines passing through the center of the head. In other words, the cutting edge $m$, instead of being placed in line with the center of the head, is advanced beyond this line, as shown in Fig. 2, and from the cutting edge $m$ back toward the rear side of these members, the edge is slightly backed off to provide clearance, as usual in tools of this character.

About midway between the boring members $d$ are milled four equally spaced grooves $o$ whose sides are parallel with the adjacent wall of the grooves $c$, which grooves extend through the head longitudinally from one end to the other. This construction permits the boring of holes $p$ at right angles to the members $d$, extending through the head from one side to the other. These holes are for the reception of pins $q$, flattened off on one side, as at $r$, Fig. 4, and slightly tapered. These pins $q$ extend through slots $s$ in the boring members $d$, which register with the holes $p$. The heel of the boring members $d$ is formed on a curve, as $t$, which corresponds with the curve $e$, located at the back end of the groove $c$. The forward end of the members $d$ is beveled off to form the beveled cutting edge $m$, referred to, the bevel of this end of said members being at the same angle as the beveled off corner $f$ of the head. When the members $d$ are in operative position in the head, this cutting edge extends only as far beyond the beveled corner $f$, as is necessary to provide for the requisite depth of the cut; and thus this cutting edge may be so rigidly backed up as to permit the tool to be fed toward the work in such manner as to cut a heavy chip.

In assembling the tool, the boring members $d$ are inserted in their respective grooves $c$, and the pins $q$ are then forced into the holes $p$ provided therefor, to lock the members $d$, the flattened sides of the pins being located next the center of the head. These pins, after the cutting members $d$ have been forced backward toward the shank $b$, as far as they will go, are then driven in tightly, and the nut $h$ is then screwed up on the rear end of the head to constitute an abutment for the rear end of the boring members $d$. When the cutting edges $m$ of these members become dulled, they are sharpened in the usual manner, the pins $q$ being loosened, and the nut $h$ then turned up far enough to compensate for the wear of the cutting edges, and the pins $q$ are again driven home to lock the members $d$ in the head. The nut $h$ is always the abutment which will take the end-thrust of the members $d$, the pins $q$ merely serving to hold these members in fixed position relative to the longitudinal center of the head, whereby the external diameter of the tool through the members $d$, may be always the same. It should be stated that the projecting edge of the cutting members $d$ projects an equal or uniform distance beyond the curved outer surface of the head $a$ and therefore serves or constitutes a guiding surface for the tool as it progresses into the work.

What I claim, is:—

In a boring tool, the combination with the grooved head member, a plurality of cutting members, slidably located in the grooves of said head member, means for adjusting the cutting members, holes $p$ transversely located in the head member, elongated slots $s$ in the cutting members and adapted to register with the holes in the head member, pins $q$ provided with a flattened surface $r$ adapted for insertion in the holes and slots, whereby the cutting members may be longitudinally adjusted and locked in the head member, and whereby when the pins are loosened the cutting members may be longitudinally adjusted by means of the nut, as described.

OSCAR B. ELDER.

Witnesses:
K. I. CLEMONS,
HARRY W. BOWEN.